(12) United States Patent
Lei

(10) Patent No.: US 9,391,864 B2
(45) Date of Patent: Jul. 12, 2016

(54) INTERNET SERVICE CONTROL METHOD, AND RELEVANT DEVICE AND SYSTEM

(71) Applicant: Huawei Technologies Co., Ltd., Shenzhen (CN)

(72) Inventor: Zhengxiong Lei, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 368 days.

(21) Appl. No.: 13/952,104

(22) Filed: Jul. 26, 2013

(65) Prior Publication Data
US 2013/0311654 A1 Nov. 21, 2013

Related U.S. Application Data

(63) Continuation of application No. PCT/CN2011/073513, filed on Apr. 29, 2011.

(51) Int. Cl.
*G06F 15/16* (2006.01)
*H04L 12/26* (2006.01)
(Continued)

(52) U.S. Cl.
CPC ............. *H04L 43/10* (2013.01); *H04L 67/22* (2013.01); *H04L 67/2876* (2013.01); *H04W 4/20* (2013.01)

(58) Field of Classification Search
USPC .......................................... 709/224
See application file for complete search history.

(56) References Cited

U.S. PATENT DOCUMENTS

| 6,185,625 | B1 * | 2/2001 | Tso | ............... G06F 17/30905 707/E17.121 |
| 6,247,050 | B1 * | 6/2001 | Tso | ............... H04L 29/06 709/203 |
| 6,311,215 | B1 * | 10/2001 | Bakshi | ............... G06F 17/30905 707/E17.121 |

(Continued)

FOREIGN PATENT DOCUMENTS

| CN | 1859735 A | 11/2006 |
| CN | 101217512 A | 7/2008 |

(Continued)

OTHER PUBLICATIONS

Foreign Communication From a Counterpart Application, Chinese Application No. 201180000437.X, Chinese Office Action dated Aug. 22, 2013, 6 pages.

(Continued)

*Primary Examiner* — Alicia Baturay
(74) *Attorney, Agent, or Firm* — Conley Rose, P.C.; Grant Rodolph; Nicholas K. Beaulieu

(57) ABSTRACT

An Internet service control method, and a relevant device and system are disclosed. An Internet service control method is applied to a terminal device deployed with an Internet service client, where the method includes: monitoring a type of a message which the Internet service client is ready to send to an application server through an air interface; and when monitoring that the sent message is a heartbeat message or polling message, intercepting the heartbeat message or polling message, where the application server is configured to process a service corresponding to the Internet service client, the application server further communicates with a second service proxy function entity through a second communication channel, the second communication channel includes no air interface channel, and the second service proxy function entity proxies the Internet service client to send the heartbeat message or polling message to the application server.

15 Claims, 10 Drawing Sheets

(51) Int. Cl.
*H04L 29/08* (2006.01)
*H04W 4/20* (2009.01)

(56) References Cited

U.S. PATENT DOCUMENTS

| | | | | |
|---|---|---|---|---|
| 6,343,323 | B1* | 1/2002 | Kalpio | G06Q 20/102 705/34 |
| 6,345,300 | B1* | 2/2002 | Bakshi | H04L 63/029 709/203 |
| 6,397,246 | B1* | 5/2002 | Wolfe | G06F 17/30902 707/E17.12 |
| 6,636,503 | B1* | 10/2003 | Shiran | H04Q 3/0029 370/352 |
| 6,816,917 | B2* | 11/2004 | Dicorpo | G06F 3/0617 710/36 |
| 6,823,401 | B2* | 11/2004 | Feather, Jr. | H04L 12/2602 710/15 |
| 6,889,244 | B1* | 5/2005 | Gaither | G06F 9/54 709/202 |
| 7,484,218 | B2* | 1/2009 | Marcos | G06F 9/548 719/315 |
| 7,586,857 | B2* | 9/2009 | Ejzak | H04M 3/56 370/260 |
| 7,647,164 | B2* | 1/2010 | Reeves | H04L 67/16 455/404.2 |
| 8,131,281 | B1* | 3/2012 | Hildner | H04L 41/0806 455/418 |
| 8,205,213 | B2* | 6/2012 | Marcos | G06F 9/548 719/313 |
| 8,346,824 | B1* | 1/2013 | Lyle | G06F 17/30206 707/822 |
| 8,490,176 | B2* | 7/2013 | Book | G06F 21/305 713/165 |
| 8,875,219 | B2* | 10/2014 | Wilson | G06F 21/6245 713/168 |
| 8,886,252 | B2* | 11/2014 | Luke | H04M 1/6041 455/550.1 |
| 2002/0161904 | A1* | 10/2002 | Tredoux | H04L 63/0281 709/229 |
| 2006/0182288 | A1* | 8/2006 | Arcaria | H04R 29/007 381/82 |
| 2007/0061813 | A1* | 3/2007 | Beal | G06F 9/445 718/105 |
| 2008/0267144 | A1* | 10/2008 | Jano | H04L 67/2819 370/338 |
| 2009/0227251 | A1* | 9/2009 | Lei | H04J 11/0069 455/425 |
| 2010/0015926 | A1* | 1/2010 | Luff | H04L 41/0604 455/67.13 |
| 2010/0233992 | A1* | 9/2010 | Nooren | H04L 12/5855 455/404.1 |
| 2011/0145406 | A1* | 6/2011 | Ze | H04L 43/06 709/224 |
| 2012/0210306 | A1* | 8/2012 | Tucker | G06F 11/3688 717/126 |

FOREIGN PATENT DOCUMENTS

| | | |
|---|---|---|
| CN | 101364998 A | 2/2009 |
| CN | 101730273 A | 6/2010 |
| CN | 101742422 A | 6/2010 |
| CN | 101951330 A | 1/2011 |
| CN | 102572939 A | 7/2012 |
| EP | 1883201 A1 | 1/2008 |
| WO | 2008115778 A1 | 9/2008 |

OTHER PUBLICATIONS

Foreign Communication From a Counterpart Application, Chinese Application No. 201180000437.X Chinese Office Action dated Dec. 27, 2012, 7 pages.
Foreign Communication From a Counterpart Application, PCT Application No. PCT/CN2011/073513, Chinese Search Report dated Feb. 7, 2012, 7 pages.
Foreign Communication From a Counterpart Application, PCT Application No. PCT/CN2011/073513, Chinese Written Opinion dated Feb. 16, 2012, 4 pages.
Foreign Communication From a Counterpart Application, European Application No. 11758828.5, Extended European Search Report dated Feb. 18, 2014, 7 pages.
Zheng, R., et al., "On-demand Power Management for Ad Hoc Networks," Elsevier, Ad Hoc Networks, vol. 3, No. 1, XP027627570, Jan. 1, 2005, 18 pages.

* cited by examiner

US 9,391,864 B2

INTERNET SERVICE CONTROL METHOD, AND RELEVANT DEVICE AND SYSTEM

CROSS-REFERENCE TO RELATED APPLICATION

This application is a continuation of International Application No. PCT/CN2011/073513, filed on Apr. 29, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to an Internet service control method, a service proxy function entity and an Internet service control system.

BACKGROUND

Currently, mobile Internet services cause huge impact on the mobile network. However, in these mobile Internet services, impact on the instant messaging (IM)/social networking services (SNS)/instant mail (mail) service such as QQ, Sina microblog, Facebook, Twitter, and Gmail is particularly huge.

For example, in China, QQ causes huge impact on the mobile second-generation (2G) packet switched domain network, and although traffic of QQ is small (the occupation proportion being less than 16%), QQ occupies a large number of air interface resources (generally occupying more than 50% of common control channel (CCCH) resources, and more than 60% of packet data channel (PDCH) resources. Other IM/SNS/instant mail services all lead to a similar problem.

It is found in practice that, main reasons why the IM/SNS/instant mail service enormously occupies air interface radio resources of the mobile network include: frequent polling messages (which a client sends to an application server at regular intervals to check whether there is an updated message) or heartbeats of this type of service. There is message exchange between these heartbeat/polling messages every small period of time (such as every 30 seconds (s) or 3 minutes for QQ), so that the message exchange occupies a large number of resources. How to effectively reduce enormous occupation of the IM/SNS/instant mail service such as QQ on air interface resources of the mobile network is a problem which both operators and the industry pay much attention to.

Taking the solving of the problem of air interface resource occupation of the QQ service as an example, one existing technology is to deploy a deep packet inspection (DPI) service identification function, which may identify a QQ service data packet, on a gateway device. After the gateway device identifies that a data packet requiring downlink transmission is a data packet generated by the QQ service, the gateway device delivers corresponding identification information along with the QQ service data packet to a radio access network device; when the radio access network device allocates radio resources for the transmission of the QQ service data packet, the radio access network device performs corresponding optimization by adjusting the air interface resource allocation and processing manner, for example, the number of PDCH service channels allocated to the QQ service may be reduced, so as to reduce occupation of QQ data packets on PDCH resources; the duration of downlink Temporary Block Flow (TBF) delay release of the QQ service may be reduced, so as to reduce occupation of air interface resources. However, the mechanism can only optimize occupation of downlink QQ data packets on air interface resources, but cannot optimize occupation of uplink QQ data packets on air interface resources; the mechanism cannot fundamentally solve the problem that "air interface resources are enormously occupied by some mobile Internet," and the scheme test shows that generally the number of occupied service channels can only be reduced by 6%.

SUMMARY

Embodiments of the present invention provide an Internet service control method, a service proxy function entity and an Internet service control system, which are used to solve the problem in the prior art that "air interface resources are enormously occupied by some mobile Internet services."

In order to solve the above technical problem, the embodiments of the present invention provide the following technical solutions.

An Internet service control method is applied to a terminal device deployed with an Internet service client, where the method includes: monitoring a type of a message which the Internet service client is ready to send to an application server through an air interface; and when monitoring that the sent message is a heartbeat message or polling message, intercepting the heartbeat message or polling message, in which, the application server is configured to process a service corresponding to the Internet service client, the application server further communicates with a second service proxy function entity through a second communication channel, the second communication channel includes no air interface channel, and the second service proxy function entity proxies the Internet service client to send the heartbeat message or polling message to the application server.

An Internet service control method is applied to a second service proxy function entity, in which the second service proxy function entity communicates with an application server through a second communication channel, the second communication channel includes no air interface channel, the application server is configured to process a service corresponding to the Internet service client, and the method includes: proxying the Internet service client deployed in a terminal device to generate a heartbeat message or polling message; proxying the Internet service client to send the generated heartbeat message or polling message to the application server, in which a first service proxy function entity deployed in the terminal device further monitors a type of a message which the Internet service client is ready to send to the application server through an air interface; and when monitoring that the sent message is a heartbeat message or polling message, intercepts the heartbeat message or polling message.

A service proxy function entity is provided, where the service proxy function entity is deployed in a terminal device, in which an Internet service client is further deployed in the terminal device, and the service proxy function entity includes: a monitoring module configured to monitor a type of a message which the Internet service client is ready to send to an application server through an air interface; and a message intercepting module configured to, when the monitoring module monitors that the sent message is a heartbeat message or polling message, intercept the heartbeat message or polling message, in which, the application server is configured to process a service corresponding to the Internet service client, the application server further communicates with a second service proxy function entity through a second communication channel, the second communication channel includes no air interface channel, and the second service proxy function entity proxies the Internet service client to send the heartbeat message or polling message to the application server.

A service proxy function entity is provided, where the service proxy function entity communicates with an application server through a second communication channel, the second communication channel includes no air interface channel, the application server is configured to process a service corresponding to an Internet service client deployed in a terminal device, and the service proxy function entity includes: a proxy generating module configured to proxy the Internet service client to generate a heartbeat message or polling message; a proxy sending module configured to proxy the Internet service client to send the generated heartbeat message or polling message to the application server, in which a first service proxy function entity deployed in the terminal device further monitors a type of a message which the Internet service client is ready to send to the application server through an air interface; and when monitoring that the sent message is a heartbeat message or polling message, intercepts the heartbeat message or polling message.

An Internet service control system includes: a second service proxy function entity, and a first service proxy function entity which is deployed in a terminal device, in which the second service proxy function entity communicates with an application server through a second communication channel, the second communication channel includes no air interface channel, and the application server is configured to process a service corresponding to an Internet service client deployed in the terminal device; the first service proxy function entity is configured to monitor a type of a message which the Internet service client is ready to send to the application server through an air interface; and when monitoring that the sent message is a heartbeat message or polling message, intercept the heartbeat message or polling message; and the second service proxy function entity is configured to proxy the Internet service client to generate a heartbeat message or polling message; and proxy the Internet service client to send the generated heartbeat message or polling message to the application server.

It can be seen from above description that, in the embodiments of the present invention, a terminal device deployed with an Internet service client monitors a type of a message which the Internet service client is ready to send to an application server through an air interface; and when monitoring that the sent message is a heartbeat message or polling message, intercepts the heartbeat message or polling message. The application server configured to process a service corresponding to the Internet service client communicates with a second service proxy function entity through a second communication channel, and because the second communication channel includes no air interface channel, if the second service proxy function entity further proxies the Internet service client to send the heartbeat message or polling message to the application server, inefficient occupation air interface radio resources by the heartbeat message or polling message may be effectively avoided under the situation that the normal service of the Internet service client is not influenced as much as possible, thereby greatly saving air interface radio resources.

BRIEF DESCRIPTION OF THE DRAWINGS

To illustrate the technical solutions in the embodiments of the present invention more clearly, the accompanying drawings required for describing the embodiments of the present invention are briefly introduced in the following. Apparently, the accompanying drawings in the following description merely show some embodiments of the present invention, and persons of ordinary skill in the art still may derive other drawings from these accompanying drawings without creative efforts.

DETAILED DESCRIPTION

Embodiments of the present invention provide an Internet service control method, a service proxy function entity and an Internet service control system, so as to decrease inefficient occupation of a mobile Internet service on radio resources.

To make the objectives, features and advantages of the present invention more comprehensible, the technical solutions in the embodiments of the present invention are clearly described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative effects shall fall within the protection scope of the present invention.

Figure 1:
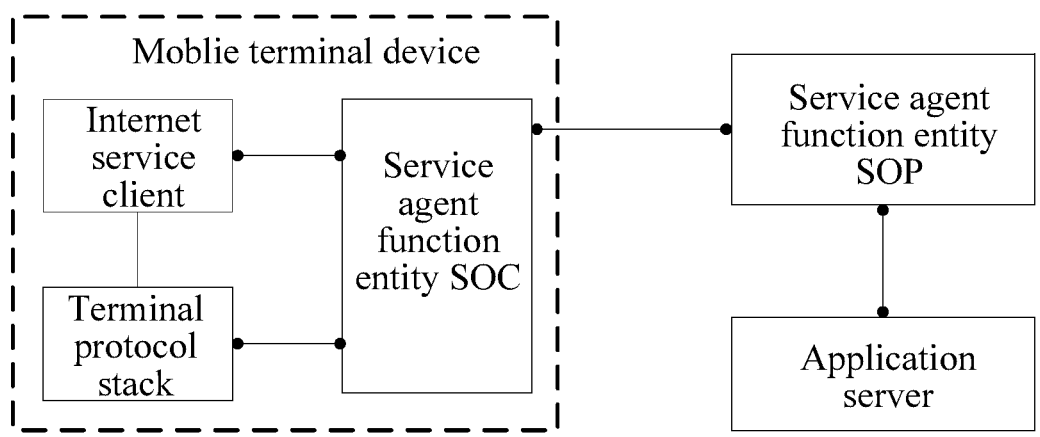
FIG. 1 is a schematic diagram of a service architecture according to an embodiment of the present invention.

First, referring to FIG. 1, an embodiment of the present invention proposes a new service architecture, a service proxy function entity (SOC for short, or called a terminal side service proxy function entity) may be deployed in a terminal device deployed with an Internet service client (for example an IM service client such as QQ, an SNS service client such as microblog/Facebook, and an instant mail service client), a service proxy function entity (which may be called SOP for short) is deployed in an access network element or a gateway network element, or the SOP may also be independently deployed, and is connected to an access network element or a gateway network element in a wired manner (or in a wireless manner such as microwave).

Functions of the SOC mainly include: intercepting a heartbeat/polling message which the Internet service client deployed in the terminal device and is ready to send through an air interface. Functions of the SOP mainly include: proxying the Internet service client to send the heartbeat/polling message to the application server, and the SOC and the SOP may cooperate to optimize an IM/SNS/instant mail service having characteristics of frequent heartbeat/polling messages. The scheme of the embodiment of the present invention may be specifically implemented based on the service architecture shown in FIG. 1.

It is first noted that, the air interface mentioned in the embodiment of the present invention refers to a wireless communication interface between a terminal device and an access network element (such as a base station).

Detailed illustration is made below through specific embodiments.

First, an Internet service control method is described from the perspective of a terminal device. An embodiment of the Internet service control method of the present invention is applied to a terminal device deployed with an Internet service client, and the method includes: monitoring a type of a message which the Internet service client is ready to send to an application server through an air interface; and when monitoring that the sent message is a heartbeat message or polling message, intercepting the heartbeat message or polling message, where the application server is configured to process a service corresponding to the Internet service client, the application server further communicates with a second service proxy function entity through a second communication channel, the second communication channel includes no air interface channel, and the second service proxy function entity proxies the Internet service client to send the heartbeat message or polling message to the application server.

Figure 2:
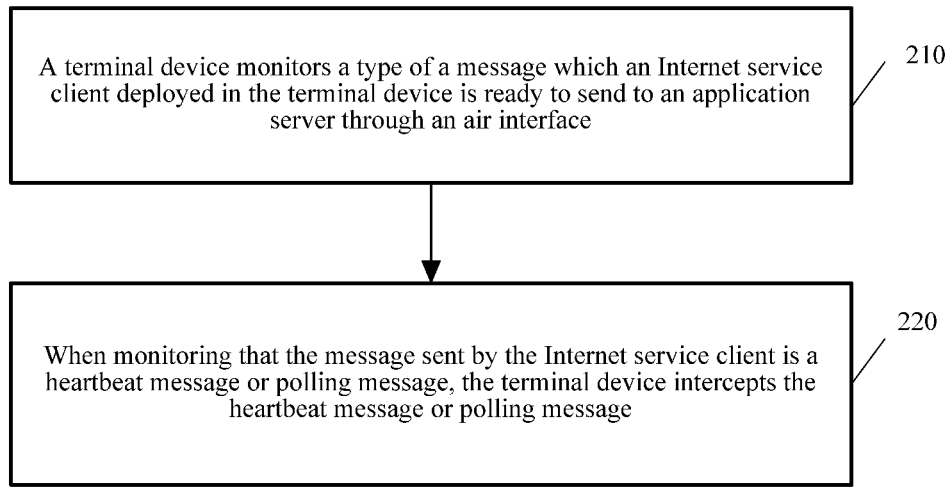
FIG. 2 is a schematic flow chart of an Internet service control method according to an embodiment of the present invention.

Referring to FIG. 2, the specific steps may be included as follows.

210: A terminal device monitors a type of a message which an Internet service client deployed in the terminal device is ready to send to an application server through an air interface.

In a practical application, a first service proxy function entity (such as SOC) deployed in a terminal device may, on a physical layer, a data link layer, a network layer (such as an Internet Protocol (IP) layer) or a transmission layer or another layer of a terminal protocol stack, monitor a type of a message which a certain Internet service client (for example an IM service client such as QQ, a social networking services service client such as microblog/Facebook, and an instant mail service client) deployed in the terminal device is ready to send to an application server through an air interface. The application server is configured to process a service corresponding to the Internet service client, for example, the Internet service client is a QQ client, while the application server is a QQ server, or, the Internet service client is a Sina microblog client, while the application server is a Sina microblog application server; and other scenarios may be deduced by analogy. The first service proxy function entity may, in various manners, identify a type of a message which the Internet service client is ready to send to the application server through the air interface, which is a heartbeat message or polling message, or a service message (the service message may be, for example, a service message which the Internet service client is ready to send to another Internet service client through the application server, or a service message which the Internet service client is ready to send to the application server), or a message in another type.

220: When monitoring that the message sent by the Internet service client is a heartbeat message or polling message, the terminal device intercepts the heartbeat message or polling message.

The application server further communicates with a second service proxy function entity (the second service proxy function entity may be, for example, deployed in an access network element or a gateway network element, or may be connected to an access network element or a gateway network element) through a second communication channel, the second communication channel includes no air interface channel, and the second service proxy function entity may proxy the Internet service client to send a heartbeat message or polling message to the application server. The second communication channel may include a wired communication channel borne by optical fiber or cables, and may further include a wireless communication channel such as microwave.

In a practical application, a first service proxy function entity (such as SOC) deployed in a terminal device may intercept a heartbeat message or polling message sent by an Internet service client to an application server, and definitely may further intercept another message which is sent by the Internet service client to the application server and which has set characteristics, and the set characteristics at least include: being specially used to request service content update, or being specially used to maintain a link connection, or being specially used to maintain an online state, or performing sending at a fixed interval. The second service proxy function entity (such as SOP) may proxy the Internet service client to send a heartbeat message or polling message to the application server, and may further proxy the Internet service client to send another message having the foregoing set characteristics to the application server. In this way, the heartbeat message or polling message which the Internet service client is ready to send to the application server through the air interface is intercepted at the terminal device, so inefficient occupation of air interface radio resources caused due to that the terminal device sends the heartbeat message or polling message to a network through an air interface does not appear anymore, in which the inefficient occupation may be understood as use of air interface radio resources in low efficiency. For example, the data amount (payload) of the heartbeat message or polling message is very small, but generally there is little difference between air interface radio resources required to be allocated for transmitting each heartbeat message or polling message in an air interface channel and air interface radio resources allocated for transmitting another service message (such as a QQ buddy message); relative to transmission of a service message, frequently transmitting a message with a very small data amount such as a heartbeat message or polling message by using a radio resource amount nearly equivalent to that for transmitting the service message may be regarded as inefficient occupation of air interface radio resources.

In an application scenario, after monitoring that the Internet service client sends a login request message or successfully logs onto the application server (the first service proxy function entity may learn that the Internet service client successfully logs onto the application server by monitoring a program progress corresponding to the Internet service client, or may learn that the Internet service client successfully logs onto the application server after receiving a response message of successful login from the application server), the first service proxy function entity deployed in the terminal device may further send an area identifier of an area where the terminal device is currently located to the second service proxy function entity (the area identifier may, for example, include an identifier of a tracking area, an identifier of a position area, an identifier of a position area or an identifier of another area), so that the second service proxy function entity determines, according to the area identifier, whether an Internet service optimization function needs to be started in the area where the terminal device is currently located (for example, use situations of air interface resources of different areas may be different), the Internet service optimization function may be started in an area where the use of air interface resources is relatively insufficient (for example, the use rate of air interface resources of the area is greater than a certain threshold), the Internet service optimization function may temporarily not be started in an area where the use of air interface resources is relatively ample (for example, the use rate of air interface resources of the area is less than a certain threshold), and the second service proxy function entity determines, according to the current use rate of air interface resources of the area corresponding to the area identifier, whether the Internet service optimization function needs to be started in the area where the terminal device is currently located; or, it may be pre-configured that the Internet service optimization function needs to be correspondingly started in certain areas, while the Internet service optimization function does not need to be correspondingly started in other certain areas, and the second service proxy function entity may determine, according to configuration information, whether the Internet service optimization function needs to be started in the area where the terminal device is currently located. Moreover, if receiving indication information of starting the Internet service optimization function sent by the second service proxy function entity, the first service proxy function entity starts the Internet service optimization function, so as to execute the step of monitoring a type of a message which the Internet service client is ready to send to an application server through an air interface.

Moreover, when monitoring that the message sent by the Internet service client is a service message, the first service proxy function entity may further forward the service message to the second service proxy function entity (so that after receiving the service message, the second service proxy function entity forwards the service message to the application server, and receives a response message which is correspondingly returned by the application server after the application server receives the service message); and receive the response message sent by the second service proxy function entity and forward the response message to the Internet service client. Alternatively, when monitoring that the message sent by the Internet service client is a service message, the first service proxy function entity may further directly forward the service message to the application server; and receive a response message which is returned by the application server after the application server receives the service message and forward the response message to the Internet service client. Alternatively, when monitoring that the message sent by the Internet service client is a service message, the first service proxy function entity may also perform no processing on the service message, and instead, the Internet service client directly sends the service message to the application server; the Internet service client may further receive a response message which is returned by the application server after the application server receives the service message.

It can be seen from above description that, in this embodiment, a terminal device deployed with an Internet service client monitors a type of a message which the Internet service client is ready to send to an application server through an air interface; and when monitoring that the sent message is a heartbeat message or polling message, it intercepts the heartbeat message or polling message. The application server configured to process a service corresponding to the Internet service client communicates with a second service proxy function entity through a second communication channel, and because the second communication channel includes no air interface channel, if the second service proxy function entity further proxies the Internet service client to send the heartbeat message or polling message to the application server, inefficient occupation on air interface radio resources by the heartbeat message or polling message may be effectively avoided under the situation that the normal service of the Internet service client is not influenced as much as possible, thereby greatly saving air interface radio resources; therefore, these resources may be used to perform other services, thereby facilitating more efficient utilization of air interface radio resources.

Description is made below from the perspective of a second service proxy function entity (such as SOP). Another embodiment of an Internet service control method of the present invention is applied to a second service proxy function entity, in which the second service proxy function entity communicates with an application server through a second communication channel, the second communication channel includes no air interface channel, the application server is configured to process a service corresponding to an Internet service client, and the method includes: proxying the Internet service client deployed in a terminal device to generate a heartbeat message or polling message; proxying the Internet service client to send the generated heartbeat message or polling message to the application server, in which a first service proxy function entity deployed in the terminal device further monitors a type of a message which the Internet service client is ready to send to the application server through an air interface; and when monitoring that the sent message is a heartbeat message or polling message, intercepts the heartbeat message or polling message.

Figure 3:
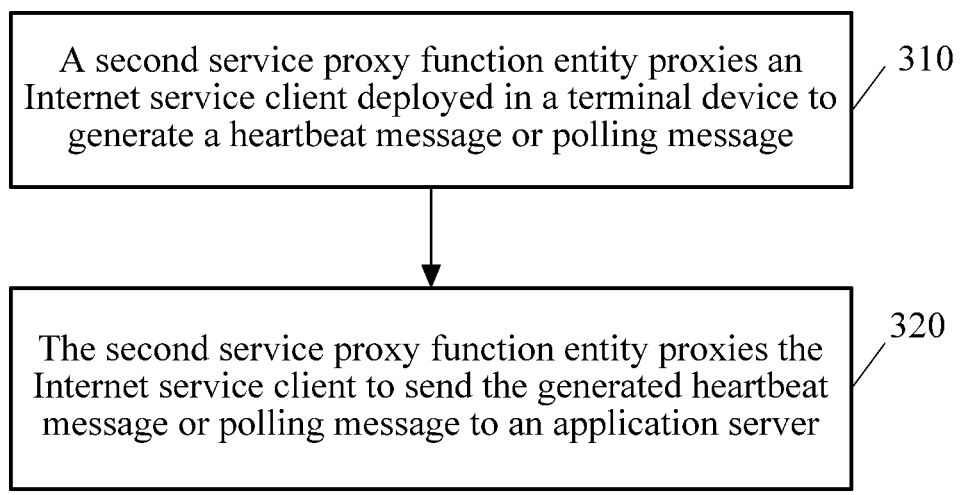
FIG. 3 is a schematic flow chart of another Internet service control method according to an embodiment of the present invention.

Referring to FIG. 3, the specific steps may be included as follows.

310: A second service proxy function entity proxies an Internet service client deployed in a terminal device to generate a heartbeat message or polling message.

320: The second service proxy function entity proxies the Internet service client to send the generated heartbeat message or polling message to an application server.

The second service proxy function entity communicates with an application server through a second communication channel, the second communication channel includes no air interface channel, and the application server is configured to process a service corresponding to the Internet service client; a first service proxy function entity deployed in the terminal device further monitors a type of a message which the Internet service client is ready to send to the application server through an air interface; and when monitoring that the sent message is a heartbeat message or polling message, intercepts the heartbeat message or polling message. The second service proxy function entity may be, for example, deployed in an access network element or a gateway network element, or may be connected to an access network element or a gateway network element. The second communication channel may include a wired communication channel borne by optical fiber or cables, and may further include a wireless communication channel such as microwave.

In an application scenario, after monitoring that the Internet service client sends a login request message or successfully logs onto the application server (the second service proxy function entity may learn that the Internet service client successfully logs onto the application server after receiving a response message of successful login which is sent by the application server to the Internet service client, or, the application server may send, to the second service proxy function entity, an indication message indicating that the Internet service client successfully logs, and the second service proxy function entity learns that the Internet service client successfully logs onto the application server according to this indication message), the second service proxy function entity may further receive an area identifier, sent by the first service proxy function entity, of an area where the terminal device is currently located; according to the area identifier, determine whether an Internet service optimization function needs to be started in the area where the terminal device is currently located; and if the Internet service optimization function needs to be started in the area where the terminal device is currently located, send indication information of starting the Internet service optimization function to the first service proxy function entity, and execute the step of proxying the Internet service client deployed in a terminal device to generate a heartbeat message or polling message.

For example, use situations of air interface resources of different areas may be different, the Internet service optimization function may be started in an area where the use of air interface resources is relatively insufficient (for example, the use rate of air interface resources of the area is greater than a certain threshold), the Internet service optimization function may temporarily not be started in an area where the use of air interface resources is relatively ample (for example, the use rate of air interface resources of the area is less than a certain threshold), and the second service proxy function entity may, according to the current use rate of air interface resources of the area corresponding to the area identifier, determine whether the Internet service optimization function needs to be started in the area where the terminal device is currently located. Alternatively, it may be pre-configured that the Internet service optimization function needs to be correspondingly started in certain areas, while the Internet service optimization function does not need to be correspondingly started in other certain areas, and the second service proxy function entity may determine, according to configuration information, whether the Internet service optimization function needs to be started in the area where the terminal device is currently located.

In a practical application, if a first service proxy function entity (such as SOC) deployed in a terminal device not only intercepts a heartbeat message or polling message sent by an Internet service client to an application server, but also intercepts another message which is sent by the Internet service client to the application server and which has set characteristics, and the set characteristics at least include: being specially used to request service content update, or being specially used to maintain a link connection, or being specially used to maintain an online state, or performing sending at a fixed interval. In this scenario, the second service proxy function entity (such as SOP) not only can proxy the Internet service client to send another message having the foregoing set characteristics to the application server, but also can proxy the Internet service client to send a heartbeat message or polling message to the application server. In this way, the heartbeat message or polling message which the Internet service client is ready to send to the application server through the air interface is intercepted at the terminal device, and the second service proxy function entity proxies the Internet service client deployed in the terminal device to send the generated heartbeat message or polling message to the application server, so it can be ensured that the normal service of the Internet service client is not influenced, and inefficient occupation of air interface radio resources caused due to that the terminal device sends the heartbeat message or polling message to a network through an air interface does not appear anymore.

Moreover, the second service proxy function entity may further receive a service message sent by the application server to the Internet service client (the service message may be, for example, a service message which is sent through the application server by another Internet service client to the Internet service client deployed in the terminal device, or may be a service message such as an update message or a system notification message sent by the application server to the Internet service client); determine whether an IP channel between the application server and the Internet service client exists; if the IP channel between the application server and the Internet service client exists, forward the service message to the Internet service client or the first service proxy function entity through the existing IP channel; if the IP channel between the application server and the Internet service client does not exist, may instruct a short message service center to send, to the first service proxy function entity, a short message used to instruct to establish the IP channel between the Internet service client and the application server; and after the IP channel is established, forward the service message to the Internet service client or the first service proxy function entity through the IP channel.

Moreover, after learning that the terminal device is disconnected from a network, the second service proxy function entity may stop proxying the Internet service client to send the heartbeat message or polling message to the application server, and release corresponding resources.

It can be seen from above description that, in this embodiment, the application server configured to process a service corresponding to the Internet service client communicates with a second service proxy function entity through a second communication channel, the second communication channel includes no air interface channel, and the second service proxy function entity proxies the Internet service client deployed in the terminal device to send the heartbeat message or polling message to the application server; if the terminal device deployed with the Internet service client further monitors a type of a message which the Internet service client is ready to send to the application server through an air interface; and when monitoring that the sent message is a heartbeat message or polling message, intercepts the heartbeat message or polling message. Inefficient occupation on air interface radio resources by the heartbeat message or polling message may be effectively avoided under the situation that the normal service of the Internet service client is not influenced as much as possible, thereby greatly saving air interface radio resources; therefore, these resources may be used to perform other services, thereby facilitating more efficient utilization of air interface radio resources.

To better understand and implement the technical scheme of the embodiment of the present invention, introduction is made in further detail below by taking mainly the procedure that an SOC and an SOP control a QQ service of a mobile terminal as an example. For optimization of another IM service, similar reference may also be made.

Figure 4:
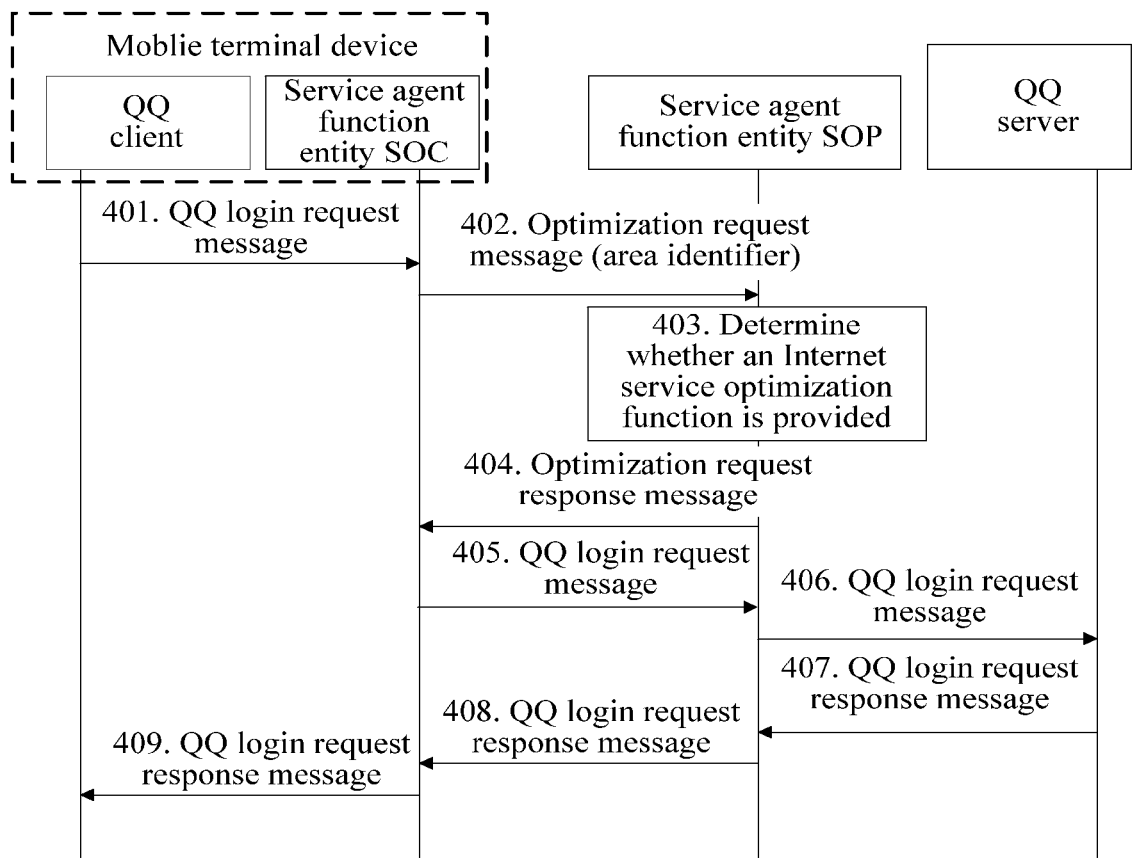
FIG. 4 is a schematic flow chart of controlling QQ login of a mobile terminal according to an embodiment of the present invention.

Referring to FIG. 4, FIG. 4 is a schematic flow chart of controlling QQ login of a mobile terminal.

401: A QQ client, after being started, is ready to send a QQ login request message through an air interface.

The QQ client and an SOC are deployed in a mobile terminal device.

402: After monitoring that the message sent by the QQ client is the QQ login request message, the SOC sends an optimization request message carrying an area identifier of an area where the mobile terminal device is located to an SOP.

The SOC may, for example, obtain area information about the area where the mobile terminal device is located in a Package Data Protocol (PDP) activation procedure of the mobile terminal device, or, the SOC may obtain area information about the area where the mobile terminal device is located from a network element such as an access network element or a mobile management network element, and the area identifier may, for example, include at least one of an identifier of a tracking area, an identifier of a position area, an identifier of a position area or an identifier of another area.

403: The SOP determines whether an Internet service optimization function is provided for the area where the mobile terminal device is located.

The SOP may for example, according to configuration information or the current use rate of air interface resources of the area corresponding to the area identifier, determine whether the Internet service optimization function needs to be started in the area where the mobile terminal device is currently located. Here, the process continues by taking that the SOP determines that an Internet service optimization function is provided for the area where the mobile terminal device is located as an example.

404: The SOP returns an optimization request response message to the SOC.

The optimization request response message returned by the SOP to the SOC carries indication information of starting the Internet service optimization function, and may further carry information about a forwarding address (the SOC subsequently may forward, to the address, a QQ uplink message sent by the QQ client).

405: The SOC receives the optimization request response message, and forwards, to the SOP, the QQ login request message from the QQ client.

The SOC may record the information about the forwarding address, and start the Internet service optimization function.

406: The SOP forwards the QQ login request message to a QQ server.

The SOP may, for example, start a virtual QQ Proxy, and the virtual QQ Proxy starts a proxy function and forwards the QQ login request message to the QQ Server.

407: The QQ Server receives the QQ login request message, and returns a QQ login request response message.

408: The SOP receives the QQ login request response message, and forwards the QQ login request response message to the SOC.

409: The SOC receives the QQ login request response message, and forwards the QQ login request response message to the QQ client.

After a QQ login operation is successful, subsequently the data exchanged between the QQ client and the QQ Server is all transferred between the QQ client<->the SOC<->the SOP<->the QQ Server.

Moreover, the SOP proxies the QQ client to begin heartbeat message exchange with the QQ server.

Figure 5:
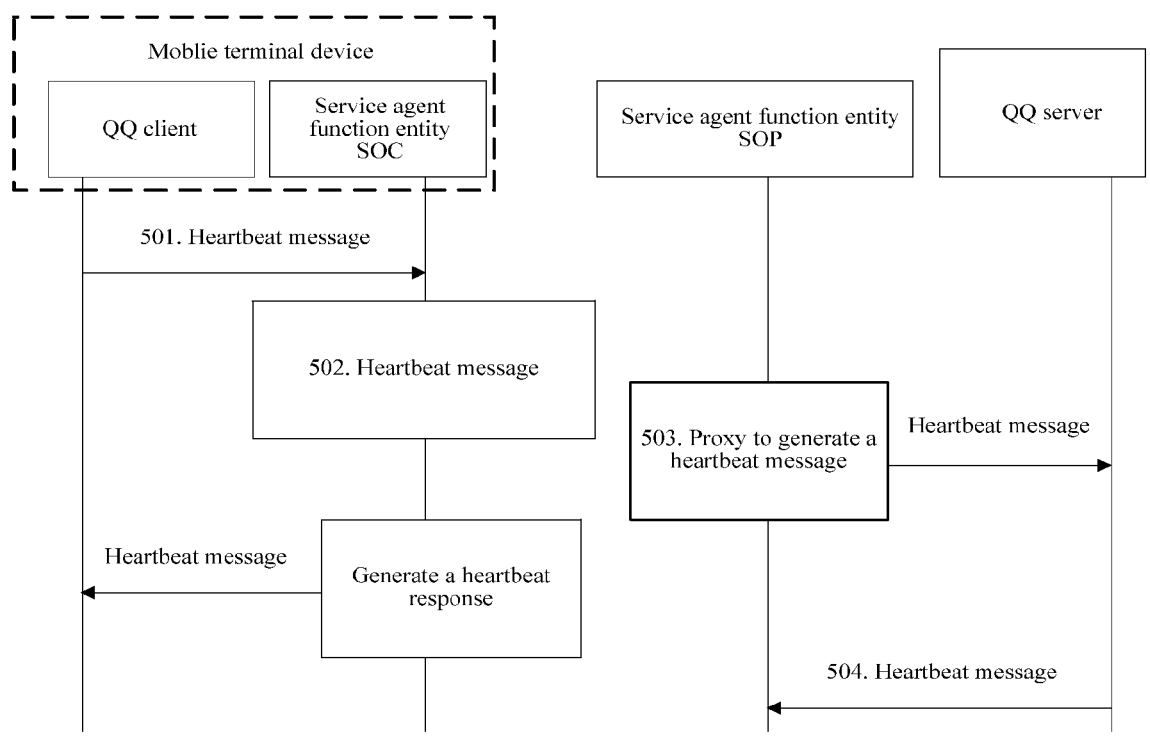
FIG. 5 is a schematic flow chart of processing a heartbeat message according to an embodiment of the present invention.

Referring to FIG. 5, FIG. 5 is a schematic flow chart of processing a QQ heartbeat message.

501: A QQ client sends a QQ heartbeat message.

502: After an SOC monitors that the message sent by the QQ client is a QQ heartbeat message, if the SOC has started an Internet service optimization function, the SOC intercepts the QQ heartbeat message and starts no air interface connection, and the SOC may further simulate a QQ Server to generate a QQ heartbeat response and send it to the QQ client.

If the SOC may monitor, on a physical layer, a data link layer, a network layer (IP layer) or a transmission layer or another layer of a terminal protocol stack, that the message sent by the QQ client is a QQ heartbeat message, the SOC may locally intercept the message.

Moreover, if the SOC does not start the Internet service optimization function, the SOC does not intercept the QQ heartbeat message, and the QQ heartbeat message is directly sent out through an air interface.

503: If the SOP has started the Internet service optimization function, the SOP proxies the QQ client to generate a QQ heartbeat message and send it to the QQ Server.

504: The QQ Server receives the QQ heartbeat message, the QQ Server processes the QQ heartbeat message and returns a QQ heartbeat response to the SOP, and the QQ heartbeat response returned by the QQ Server is terminated at the SOP.

Figure 6:
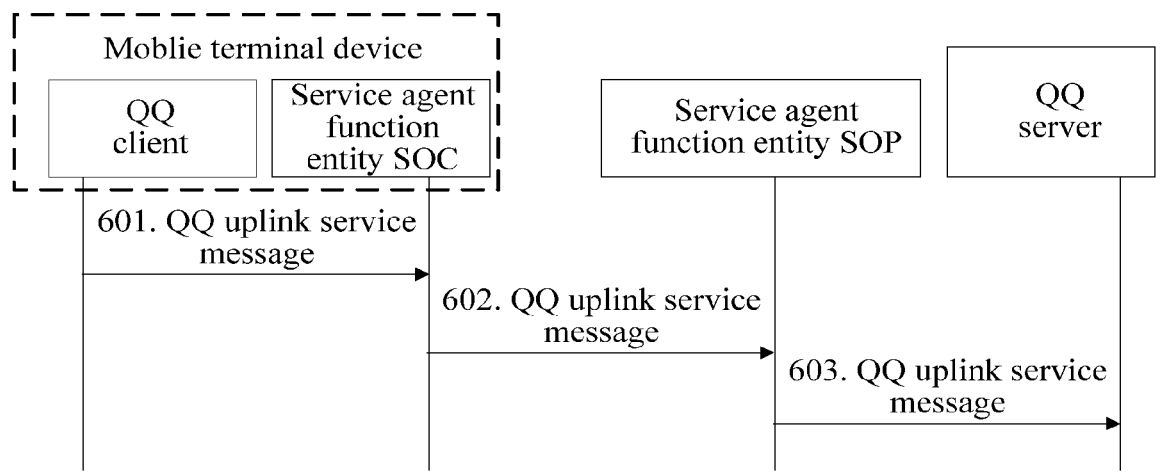
FIG. 6 is a schematic flow chart of processing a QQ uplink service message according to an embodiment of the present invention.

Referring to FIG. 6, FIG. 6 is a schematic flow chart of processing QQ uplink service messages except a heartbeat message.

601: A QQ client sends a QQ uplink service message (such as sends a QQ message to a buddy).

602: After an SOC monitors that a message which the QQ client is ready to send through an air interface is a QQ uplink service message, if an Internet service optimization function is started, the QQ uplink service message is forwarded to an SOP (QQ Proxy).

Moreover, if the Internet service optimization function is not started (this situation is not shown in FIG. 6), the QQ client sends a QQ uplink service message to a network directly through an air interface, and the SOC does not intercept the QQ uplink service message.

603: The SOP (QQ Proxy) forwards the QQ uplink service message to the QQ Server.

Next, the QQ uplink service message exchanged between the QQ client and the QQ Server is transferred between the QQ client<->the SOC<->the SOP<->the QQ Server.

Figure 7:
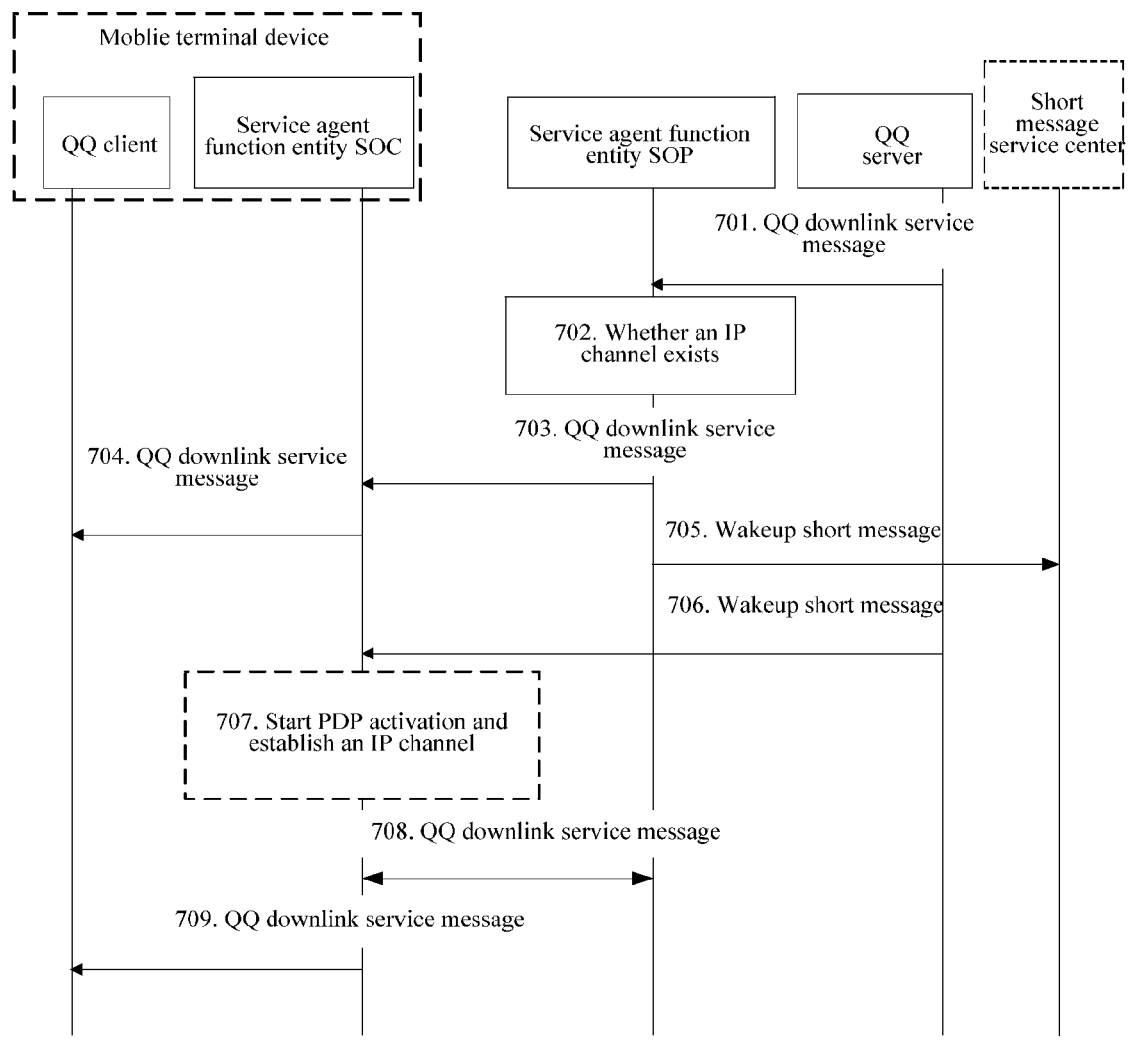
FIG. 7 is a schematic flow chart of processing a QQ downlink service message according to Embodiment 3 of the present invention.

Referring to FIG. 7, FIG. 7 is a schematic flow chart of processing a QQ downlink service message.

701: A QQ Server sends a QQ downlink service message (for example, a QQ message sent by a buddy to a QQ user) to a QQ client.

702: An SOP (QQ Proxy) receives a QQ downlink service message, and monitors whether an IP channel from a gateway general packet radio service support node (GGSN) (here taking that the SOP is deployed in a gateway network element GGSN as an example) to a mobile terminal device exists (that is, whether a PDP context of the mobile terminal device exists and is activated).

If the IP channel exists, execute steps 703 to 704, and if no IP channel exists, execute steps 705 to 709.

703: If the IP channel exists, the SOP (QQ Proxy) directly delivers the QQ downlink service message to the SOC.

704: The SOC receives the QQ downlink service message and forwards it to the QQ client.

705: If no IP channel exists, the SOP (QQ Proxy) sends a wakeup short message to a short message service center (SMSC), to instruct to establish an IP channel.

706: The SMSC sends the wakeup short message to the mobile terminal device, to instruct to establish an IP channel.

707: After receiving the wakeup short message, the SOC starts PDP activation and establishes an IP channel.

708: The SOC contacts the SOP (QQ Proxy), and acquires the QQ downlink service message from the SOP (QQ Proxy).

709: The SOC forwards the QQ downlink service message to the QQ client.

Next, the QQ downlink service message exchanged between the QQ Server and the QQ client is transferred between the QQ Server<->the SOP<->the SOC<->the QQ client.

Moreover, when the QQ client sends a QQ quit/logout message, the SOC forwards the QQ quit/logout message to the SOP (QQ Proxy); after receiving this QQ quit/logout message, the SOP (QQ Proxy) forwards it to the QQ Server; after completing a QQ quit/logout operation, the SOP terminates a QQ Proxy function for this QQ client, and releases corresponding resources.

Moreover, when the QQ client abnormally quits, such as under scenarios where the mobile terminal device leaves a mobile network service area, or the electrical plate of the mobile terminal device is taken down, the QQ client is out of contact with a mobile network before sending a quit/logout message to the QQ Server. In this case, the SOP (QQ Proxy) may continue to maintain a heartbeat connection with the QQ Server. However, when a serving general packet radio service support node (SGSN) monitors, out of date through a Reachable timer, that the mobile terminal device is disconnected from a network, or learns, in other manners, that the mobile terminal device is disconnected from the network, the SGSN may notify a GGSN (here taking that the SOP is deployed in a gateway network element GGSN as an example), the GGSN immediately notifies the situation to the SOP (QQ Proxy), the SOP (QQ Proxy) subsequently stops heartbeat exchange with the QQ Server, and the SOP terminates a QQ Proxy function for this QQ client, and release corresponding resources.

It can be understood that, this embodiment is mainly introduced by mainly taking the procedure that an SOC and an SOP control a QQ service of a mobile terminal as an example. Similar reference may also be made for optimization of another IM service (such as Microsoft Service Network (MSN)).

It can be seen from above description that, in this embodiment, the SOP is deployed in a gateway network element, the SOP communicates, through a core network, with the application server configured to process a service corresponding to the Internet service client, the SOP proxies the Internet service client deployed in the mobile terminal device to send a heartbeat message to the application server, and the SOC in the mobile terminal device deployed with the Internet service client further monitors a type of a message which the Internet service client is ready to send to the application server through an air interface; and when monitoring that the sent message is a heartbeat message, intercepts the heartbeat message. Inefficient occupation on air interface radio resources by the heartbeat message may be effectively avoided under the situation that the normal service of the Internet service client is not influenced as much as possible, thereby greatly saving air interface radio resources; therefore, these resources may be used to perform other services, thereby facilitating more efficient utilization of air interface radio resources.

Furthermore, transparency may be achieved for an application (for example, the QQ client or the QQ Server may not be changed), so market takeover is easy, the difficulty of deployment is small, and scenarios such as roaming and local (partitioned) deployment are supported; the service experience of a terminal user is not influenced.

Furthermore, various operators may be supported, and smart terminals and non-smart terminals of various standards (G/U/T) may be supported. Optimization of various services such as IM, SNS, and instant mail having a heartbeat/timing polling mechanism may be supported.

It is found through a text that, implementing the scheme of this embodiment to eliminate frequent transmission of a heartbeat/timing polling message on an air interface channel may greatly reduce consumption of air interface radio resources, and compared with non-optimization, occupation of air interface resources (PDCH and CCCH channels) may be generally reduced by up to 40%, and data traffic may be relatively reduced by up to 70%; and battery use time of a terminal device may be relatively prolonged, and compared with non-optimization, standby time of the terminal device may be generally prolonged by up to 25%.

To better understand and implement the technical scheme of the embodiment of the present invention, introduction is made in further detail below by mainly taking the procedure that an SOC and an SOP control a microblog service (taking Sina microblog as an example) of a mobile terminal device as an example. For optimization of another SNS service, similar reference may also be made.

Figure 8:
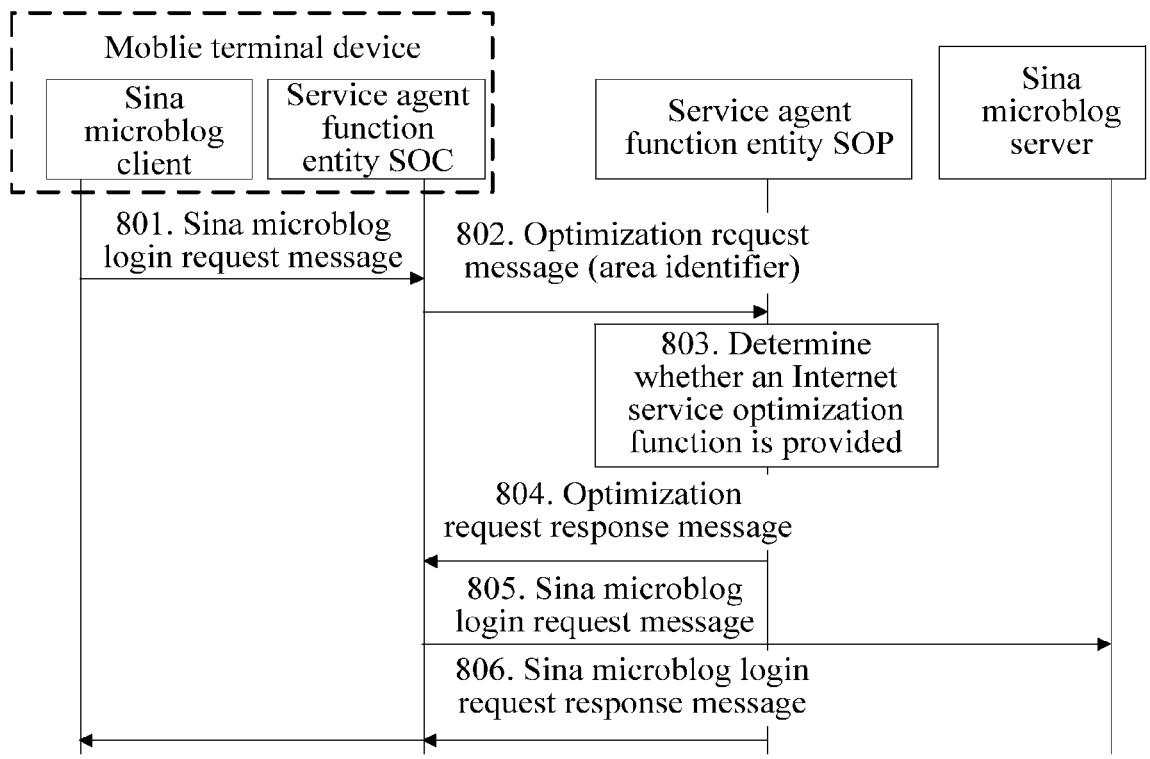
FIG. 8 is a schematic flow chart of controlling microblog login of a mobile terminal according to an embodiment of the present invention.

Referring to FIG. 8, FIG. 8 is a schematic flow chart of controlling microblog login of a mobile terminal.

801: A Sina microblog client, after being started, is ready to send a Sina microblog login request message through an air interface.

A QQ client and an SOC are deployed in a mobile terminal device.

802: The SOC monitors that the message sent by the Sina microblog client is the Sina microblog login request message, and sends, to an SOP, an optimization request message carrying an area identifier of an area where the mobile terminal device is located.

The SOC may, for example, obtain area information about the area where the mobile terminal device is located in a PDP activation procedure of the mobile terminal device, or, the SOC may obtain area information about the area where the mobile terminal device is located from a network element such as an access network element or a mobile management network element, and the area identifier may, for example, include at least one of an identifier of a tracking area, an identifier of a position area, an identifier of a position area or an identifier of another area.

803: The SOP determines whether an Internet service optimization function is provided for the area where the mobile terminal device is located.

The SOP may for example, according to configuration information or the current use rate of air interface resources of the area corresponding to the area identifier, determine whether the Internet service optimization function needs to be started in the area where the mobile terminal device is currently located. Here, the process continues by taking that the SOP determines that an Internet service optimization function is provided for the area where the mobile terminal device is located as an example.

804: The SOP returns an optimization request response message to the SOC.

The optimization request response message returned by the SOP to the SOC carries indication information of starting the Internet service optimization function, and may further carry information about a forwarding address (the SOC subsequently may forward, to the address, a Sina microblog uplink message sent by the Sina microblog client).

805: The SOC receives the optimization request response message, and forwards the Sina microblog login request message to a Sina microblog Server. The SOC may record the information about the forwarding address, and start the Internet service optimization function.

806: The Sina microblog Server receives the Sina microblog login request message, and returns a Sina microblog login request response message.

After a Sina microblog login operation is successful, subsequently the data exchanged between the Sina microblog client and the Sina microblog Server is all transferred between the Sina microblog client<->the Sina microblog Server.

Moreover, the SOP proxies the Sina microblog client to begin to exchange a polling message with the Sina microblog Server. The SOP may, for example, start a virtual Sina microblog Proxy, and the virtual Sina microblog Proxy starts a proxy function and exchanges a polling message with the Sina microblog Server.

Figure 9:
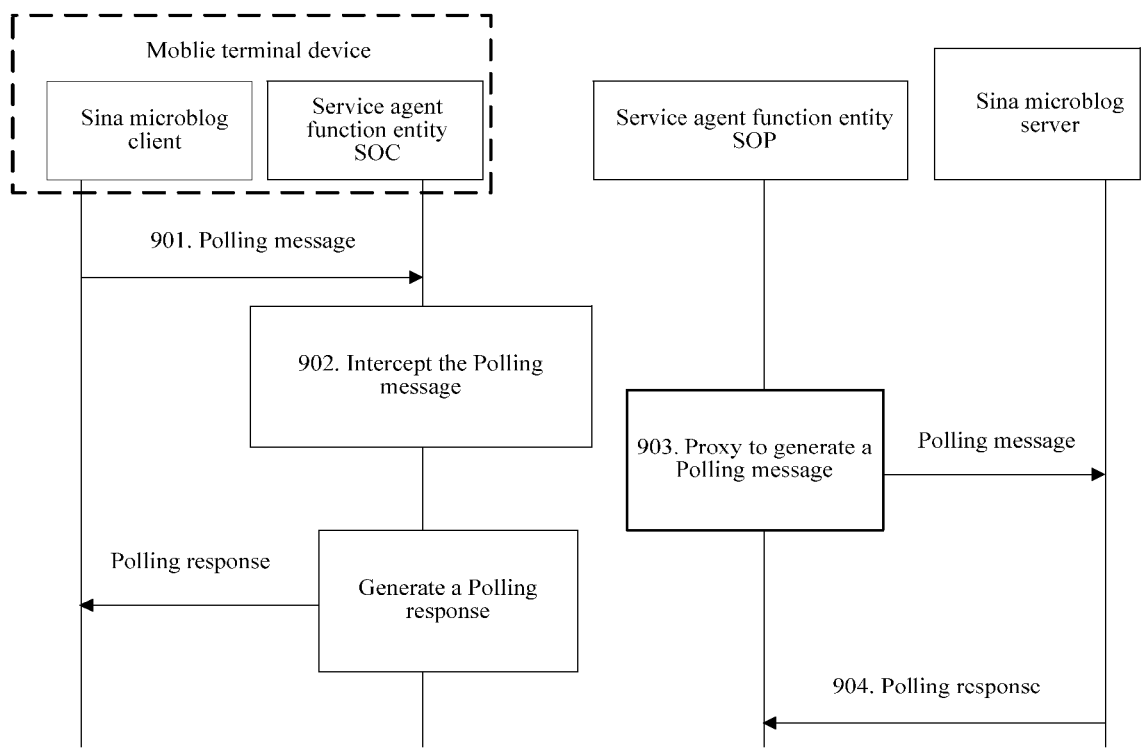
FIG. 9 is a schematic flow chart of processing a polling message according to an embodiment of the present invention.

Referring to FIG. 9, FIG. 9 is a schematic flow chart of processing a polling message.

901: A Sina microblog client sends a polling message.

902: After an SOC monitors that the message sent by the Sina microblog client is the polling message, if the SOC has started an Internet service optimization function, the SOC intercepts the polling message and starts no air interface connection, and the SOC may further simulate a Sina microblog Server to generate a Polling response and send it to the Sina microblog client (the polling response indicates that there is no update currently).

If the SOC may monitor, on a physical layer, a data link layer, a network layer (IP layer) or a transmission layer or another layer of a terminal protocol stack, that the message sent by the Sina microblog client is a polling message, the SOC may locally intercept the message.

Moreover, if the SOC does not start the Internet service optimization function, the SOC does not intercept the polling message, and the Polling message is directly sent out through an air interface.

903: If an SOP has started the Internet service optimization function, the SOP proxies the Sina microblog client to generate a polling message and send it to the Sina microblog Server.

904: The Sina microblog Server receives the polling message, and the Sina microblog Server processes the polling message and returns a polling response to the SOP.

If the polling response returned by the Sina microblog Server indicates that there is no update currently, the polling response is terminated at the SOP; if the polling response returned by the Sina microblog Server indicates that there is update currently (the polling response may carry update information), the SOP forwards the polling response to the Sina microblog client.

Figure 10:
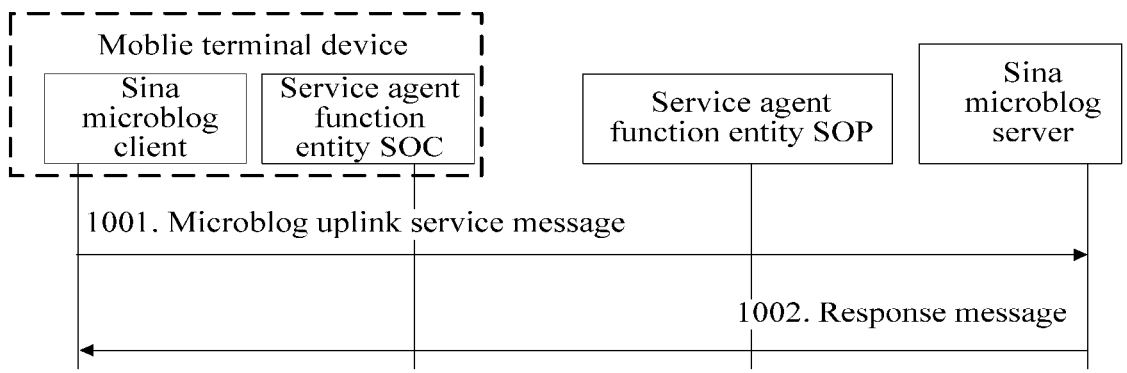
FIG. 10 is a schematic flow chart of processing a microblog service message according to an embodiment of the present invention.

Referring to FIG. 10, FIG. 10 is a schematic flow chart of processing service messages except a polling message.

1001: A Sina microblog client sends a microblog uplink service message (such as sends a microblog update message) to a Sina microblog Server through an air interface.

1002: The Sina microblog Server receives the microblog uplink service message, and returns a response.

The microblog service message exchanged between the Sina microblog client and the Sina microblog Server is transferred between the Sina microblog client<->the Sina microblog Server.

It can be understood that, this embodiment is mainly introduced by mainly taking the procedure that an SOC and an SOP control a microblog service of a mobile terminal as an example. For optimization of another SNS service, similar reference may also be made.

It can be seen from above description that, in this embodiment, the SOP may be deployed in a gateway network element, the SOP communicates, through a core network, with an application server configured to process a service corresponding to an Internet service client, the SOP proxies the Internet service client deployed in a mobile terminal device to send a polling message to the application server, and the SOC in the mobile terminal device deployed with the Internet service client further monitors a type of a message which the Internet service client is ready to send to the application server through an air interface; and when monitoring that the sent message is a polling message, intercepts the polling message. Inefficient occupation on air interface radio resources by the polling message may be effectively avoided under the situation that the normal service of the Internet service client is not influenced as much as possible, thereby greatly saving air interface radio resources; therefore, these resources may be used to perform other services, thereby facilitating more efficient utilization of air interface radio resources.

Furthermore, transparency may be achieved for an application (for example, the microblog client or the microblog Server may not be changed), so market takeover is easy, the difficulty of deployment is small, and scenarios such as roaming and local (partitioned) deployment are supported; the service experience of a terminal user is not influenced.

Furthermore, various operators may be supported, and smart terminals and non-smart terminals of various standards (G/U/T) may be supported. Optimization of various services such as IM, SNS, and instant mail having a heartbeat/timing polling mechanism may be supported.

It is found through a text that, implementing the scheme of this embodiment to eliminate frequent transmission of a heartbeat/timing polling message on an air interface channel may greatly reduce consumption of air interface radio resources, and compared with non-optimization, occupation of air interface resources (PDCH and CCCH channels) may be generally reduced by up to 40%, and data traffic may be relatively reduced by up to 70%; and battery use time of a terminal device may be relatively prolonged, and compared with non-optimization, standby time of the terminal device may be generally prolonged by up to 25%.

It should be noted that, for brevity, each of the foregoing method embodiments is represented as a series of actions. But persons skilled in the art should appreciate that the embodiment of the present invention is not limited to the order of the described actions, because according to the embodiment of the present invention, some steps may adopt other order or may be executed simultaneously. It should be further understood by persons skilled in the art that the embodiments described in the specification all belong to exemplary embodiments, and the involved actions and modules are not necessarily required by the present invention.

To better implement the technical scheme of the embodiment of the present invention, an embodiment of the present invention further provides a corresponding apparatus for implementing the foregoing technical scheme.

Figure 11:
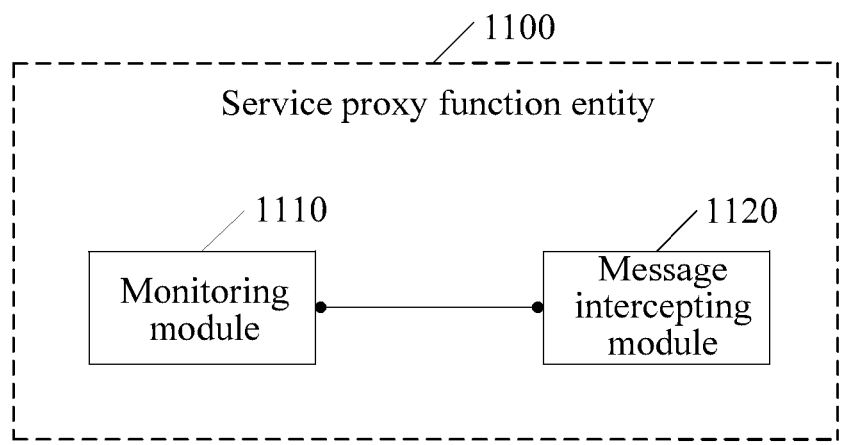
FIG. 11 is a schematic structural diagram of a service proxy function entity according to an embodiment of the present invention.

Referring to FIG. 11, an embodiment of the present invention provides a service proxy function entity 1100, the service proxy function entity 1100 is deployed in a terminal device, and an Internet service client is further deployed in the terminal device.

The service proxy function entity 1100 may include: a monitoring module 1110 and a message intercepting module 1120.

The monitoring module 1110 monitors a type of a message which the Internet service client is ready to send to an application server through an air interface.

The message intercepting module 1120 is configured to, when the monitoring module 1110 monitors that the sent message is a heartbeat message or polling message, intercept the heartbeat message or polling message.

The application server is configured to process a service corresponding to the Internet service client, the application server further communicates with a second service proxy function entity through a second communication channel, the second communication channel includes no air interface channel, and the second service proxy function entity proxies the Internet service client to send the heartbeat message or polling message to the application server.

In an application scenario, the service proxy function entity 1100 may further include: an optimization requesting instruction module configured to, after it is monitored that the Internet service client sends a login request message or successfully logs onto the application server, send an area identifier of an area where the terminal device is currently located to the second service proxy function entity, so that the second service proxy function entity determines, according to the area identifier, whether an Internet service optimization function needs to be started in the area where the terminal device is currently located.

The message intercepting module 1120 is specifically configured to, after the optimization requesting instruction module receives indication information of starting the Internet service optimization function sent by the second service proxy function entity, start the Internet service optimization function, and monitor the type of the message which the Internet service client is ready to send to the application server through the air interface.

In an application scenario, the service proxy function entity 1100 may further include: a first forwarding module and a second forwarding module, or, include a third forwarding module and a fourth forwarding module.

The first forwarding module is configured to, when the monitoring module monitors that the sent message is a service message, forward the service message to the second service proxy function entity, so that after the second service proxy function entity receives the service message, the second service proxy function entity forwards it to the application server, and receives a response message which is correspondingly returned by the application server after the application server receives the service message.

The second forwarding module is configured to receive the response message sent by the second service proxy function entity and forward it to the Internet service client.

The third forwarding module is configured to, when the monitoring module monitors that the sent message is a service message, forward the service message to the application server.

The fourth forwarding module is configured to receive a response message which is returned by the application server after the application server receives the service message and forward the response message to the Internet service client.

It can be understood that, the service proxy function entity 1100 of this embodiment may be the first service proxy function entity (such as the SOC) in the foregoing method embodiment, functions of each function module thereof may be specifically implemented according to the method introduced in the foregoing method embodiment, reference may be made to the relevant description in the foregoing embodiment for the specific implementation procedure of the functions, and details are not repeated herein.

It can be seen from the above that, in this embodiment, the service proxy function entity 1100 is deployed in the terminal device deployed with the Internet service client, the service proxy function entity 1100 monitors a type of a message which the Internet service client is ready to send to an application server through an air interface; and when monitoring that the sent message is a heartbeat message or polling message, intercepts the heartbeat message or polling message. The application server configured to process a service corresponding to the Internet service client communicates with a second service proxy function entity through a second communication channel, and because the second communication channel includes no air interface channel, if the second service proxy function entity further proxies the Internet service client to send the heartbeat message or polling message to the application server, inefficient occupation on air interface resources by the heartbeat message or polling message may be effectively avoided under the situation that the normal service of the Internet service client is not influenced as much as possible, thereby greatly saving air interface radio resources; therefore, these resources may be used to perform other services, thereby facilitating more efficient utilization of air interface radio resources.

Figure 12:
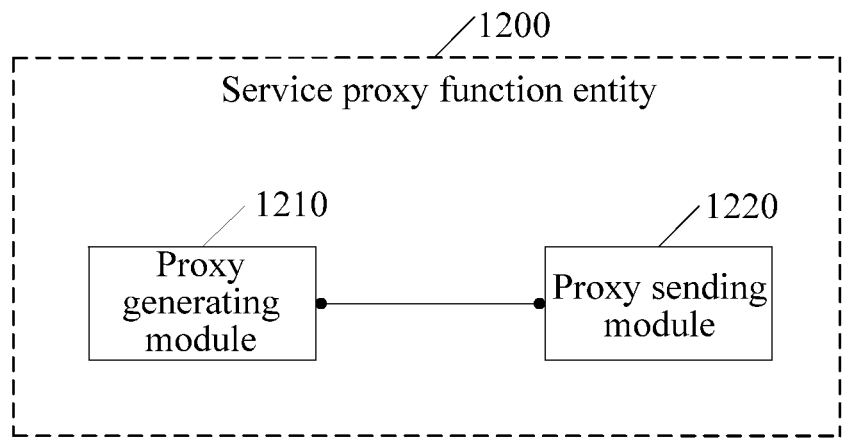
FIG. 12 is a schematic diagram of another service proxy function entity according to an embodiment of the present invention.

Referring to FIG. 12, an embodiment of the present invention provides a service proxy function entity 1200, in which the service proxy function entity 1200 communicates with an application server through a second communication channel, the second communication channel includes no air interface channel, the application server is configured to process a service corresponding to an Internet service client deployed in a terminal device, and the service proxy function entity 1200 includes: a proxy generating module 1210 and a proxy sending module 1220, in which the proxy generating module 1210 is configured to proxy the Internet service client to generate a heartbeat message or polling message; and the proxy sending module 1220 is configured to proxy the Internet service client to send the generated heartbeat message or polling message to the application server, in which a first service proxy function entity deployed in the terminal device further monitors a type of a message which the Internet service client is ready to send to the application server through an air interface; and when monitoring that the sent message is a heartbeat message or polling message, intercepts the heartbeat message or polling message.

In an application scenario, the service proxy function entity 1200 may further include: an optimization determining module configured to, after it is monitored that the Internet service client sends a login request message or successfully logs onto the application server, receive an area identifier, sent by the first service proxy function entity, of an area where the terminal device is currently located; according to the area identifier, determine whether an Internet service optimization function needs to be started in the area where the terminal device is currently located; and if the Internet service optimization function needs to be started in the area where the terminal device is currently located, send indication information of starting the Internet service optimization function to the first service proxy function entity.

In an application scenario, the service proxy function entity 1200 may further include: a receiving module and a fifth forwarding module (not shown in FIG. 12), in which the receiving module is configured to receive a service message sent by the application server to the Internet service client; and the fifth forwarding module is configured to determine whether an IP channel between the application server and the Internet service client exists; if the IP channel between the application server and the Internet service client exists, forward the service message to the Internet service client through the existing IP channel; if the IP channel between the application server and the Internet service client does not exist, instruct a short message service center to send, to the first service proxy function entity, a short message used to instruct to establish the IP channel between the Internet service client and the application server; and after the IP channel is established, forward the service message to the Internet service client through the IP channel.

It can be understood that, the service proxy function entity 1200 of this embodiment may be the second service proxy function entity (such as the SOP) in the foregoing method embodiment, functions of each function module thereof may be specifically implemented according to the method introduced in the foregoing method embodiment, reference may be made to the relevant description in the foregoing embodiment for the specific implementation procedure of the functions, and details are not repeated herein.

It can be seen from the above that, in this embodiment, the application server configured to process a service corresponding to the Internet service client communicates with the service proxy function entity 1200 through a second communication channel, the second communication channel includes no air interface channel, and the service proxy function entity 1200 proxies the Internet service client deployed in the terminal device to send the heartbeat message or polling message to the application server; if the terminal device (such as a certain function entity deployed in the terminal device) deployed with the Internet service client further monitors a type of a message which the Internet service client is ready to send to the application server through an air interface; and when monitoring that the sent message is a heartbeat message or polling message, intercepts the heartbeat message or polling message. Inefficient occupation on air interface radio resources by the heartbeat message or polling message may be effectively avoided under the situation that the normal service of the Internet service client is not influenced as much as possible, thereby greatly saving air interface radio resources; therefore, these resources may be used to perform other services, thereby facilitating more efficient utilization of air interface radio resources.

Figure 13:
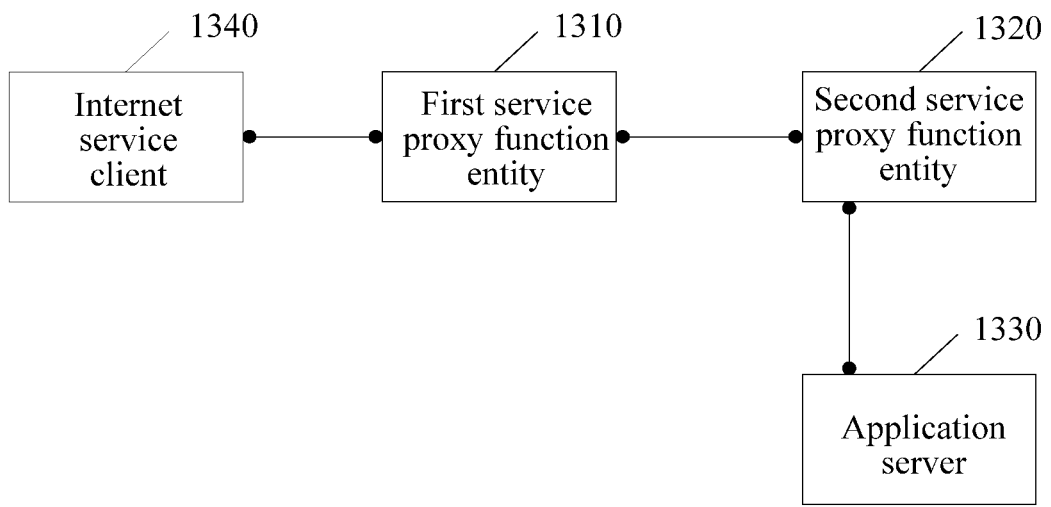
FIG. 13 is a schematic diagram of an Internet service control system according to an embodiment of the present invention.

Referring to FIG. 13, an Internet service control system provided in an embodiment of the present invention includes: a second service proxy function entity 1320, and a first service proxy function entity 1310 which is deployed in a terminal device, in which the second service proxy function entity 1320 communicates with an application server 1330 through a second communication channel, the second communication channel includes no air interface channel, and the application server 1330 is configured to process a service corresponding to an Internet service client 1340 deployed in the terminal device; the first service proxy function entity 1310 is configured to monitor a type of a message which the Internet service client 1340 is ready to send to the application server 1330 through an air interface; and when monitoring that the sent message is a heartbeat message or polling message, intercept the heartbeat message or polling message; and the second service proxy function entity 1320 is configured to proxy the Internet service client 1340 to generate a heartbeat message or polling message; and proxy the Internet service client 1340 to send the generated heartbeat message or polling message to the application server 1330.

In a practical application, the second service proxy function entity 1320 may be deployed in an access network element or a gateway network element, or may be connected to an access network element or a gateway network element.

In a practical application, the first service proxy function entity 1310 deployed in the terminal device may intercept a heartbeat message or polling message sent by the Internet service client 1340 to the application server 1330, and definitely may further intercept another message which is sent by the Internet service client to the application server and has set characteristics, and the set characteristics at least include: being specially used to request service content update, or being specially used to maintain a link connection, or being specially used to maintain an online state, or performing sending at a fixed interval. The second service proxy function entity 1320 may proxy the Internet service client 1340 to send a heartbeat message or polling message to the application server 1330, and may further proxy the Internet service client 1340 to send another message having the foregoing set characteristics to the application server 1330. In this way, the heartbeat message or polling message which the Internet service client 1340 sends to the application server 1330 through the air interface is intercepted at the terminal device, so inefficient occupation of air interface radio resources caused due to that the terminal device sends the heartbeat message or polling message to a network through the air interface does not appear anymore.

In an application scenario, after monitoring that the Internet service client 1340 sends a login request message or successfully logs onto the application server, the first service proxy function entity 1310 deployed in the terminal device may further send an area identifier of an area where the terminal device is currently located to the second service proxy function entity 1320 (the area identifier may include an identifier of a tracking area, an identifier of a position area, an identifier of a position area or an identifier of another area), and the second service proxy function entity 1320 may determine, according to the area identifier, whether an Internet service optimization function needs to be started in the area where the terminal device is currently located, and notify the first service function entity 1310 of a determination result. Moreover, if receiving indication information of starting the Internet service optimization function sent by the second service proxy function entity 1320, the first service proxy function entity 1310 starts the Internet service optimization function, so as to monitor the type of the message which the Internet service client 1340 is ready to send to the application server 1330 through the air interface.

It can be understood that, in this embodiment, the first service proxy function entity 1310 may be like the service proxy function entity 1100 (such as the SOC) of the foregoing embodiment, the second service proxy function entity 1320 may be like the service proxy function entity 1200 (such as the SOP) of the foregoing embodiment, functions of each function entity in the Internet service control system may be specifically implemented according to the method introduced in the foregoing method embodiment, reference may be made to the relevant description in the foregoing embodiment for the specific implementation procedure of the functions, and details are not repeated herein.

In the foregoing embodiments, the description of each of the embodiments has respective focuses. For a part that is not described in detail in a certain embodiment, reference may be made to the related description in other embodiments.

To sum up, in the technical scheme provided in the embodiment of the present invention, the terminal device deployed with the Internet service client monitors a type of a message which the Internet service client is ready to send to the application server through an air interface; and when monitoring that the sent message is a heartbeat message or polling message, intercepts the heartbeat message or polling message. The application server configured to process a service corresponding to the Internet service client communicates with a second service proxy function entity through a second communication channel, and because the second communication channel includes no air interface channel, if the second service proxy function entity further proxies the Internet service client to send the heartbeat message or polling message to the application server, inefficient occupation on air interface radio resources by the heartbeat message or polling message may be effectively avoided under the situation that the normal service of the Internet service client is not influenced as much as possible, thereby greatly saving air interface radio resources.

Furthermore, transparency may be achieved for an application (for example, the QQ client or QQ Server, and the microblog client or microblog Server may not be changed), so market takeover is easy, the difficulty of deployment is small, and scenarios such as roaming and local (partitioned) deployment are supported; the service experience of a terminal user is not influenced.

Furthermore, various operators may be supported, and smart terminals and non-smart terminals of various standards (G/U/T) may be supported. Optimization of various services such as IM, SNS, and instant mail having a heartbeat/timing polling mechanism may be supported.

It is found through a text that, implementing the scheme of the embodiments of the present invention to eliminate frequent transmission of a heartbeat/timing polling message on an air interface channel may greatly reduce consumption of air interface radio resources, and compared with non-optimization, occupation of air interface resource (PDCH and CCCH channels) may be generally reduced by up to 40%, and data traffic may be relatively reduced by up to 70%; and battery use time of a terminal device may be relatively prolonged, and compared with non-optimization, standby time of the terminal device may be generally prolonged by up to 25%.

Persons of ordinary skill in the art may understand that all or a part of the steps of the method in the embodiments of the present invention may be implemented by a program instructing relevant hardware. The program may be stored in a computer readable storage medium, such as a read only memory, a random access memory, a magnetic disk or an optical disk.

The Internet service control method, the service proxy function entity and the Internet service control system provided according to the embodiments of the present invention are introduced in detail above. Specific examples are used for illustrating the principle and the implementation manner of the present invention. The above description of the embodiments is merely for understanding the method and core idea of the present invention. Meanwhile, persons skilled in the art may make modifications to the specific implementation manner and application scope according to the idea of the present invention. In conclusion, the content of the specification shall not be regarded as a limitation to the present invention.

What is claimed is:

1. An Internet service control method, applied to a terminal device deployed with an Internet service client, comprising:
monitoring a type of a message which the Internet service client is ready to send to an application server through an air interface in response to receiving information indicating that an Internet service optimization function needs to be started from a second service proxy function entity, wherein the information indicating that the Internet service optimization function needs to be started indicates that a use rate of air interface resources is greater than a pre-defined threshold, and wherein the air interface resources are associated with an area where the terminal device is currently located; and
intercepting, when monitoring that the sent message is a heartbeat message or a polling message, the heartbeat message or the polling message,
wherein the application server is configured to process a service corresponding to the Internet service client,
wherein the application server further communicates with the second service proxy function entity through a second communication channel,
wherein the second communication channel comprises no air interface channel, and
wherein the second service proxy function entity proxies the Internet service client to send the heartbeat message or the polling message to the application server in response to sending the information indicating that the Internet service optimization function needs to be started to the terminal device.

2. The method according to claim 1, further comprising:
sending, after monitoring that the Internet service client sends a login request message or successfully logs onto the application server, an area identifier of the area where the terminal device is currently located to the second service proxy function entity such that the second service proxy function entity determines, according to the area identifier, whether the Internet service optimization function needs to be started in the area where the terminal device is currently located; and
starting the Internet service optimization function to execute the monitoring the type of the message which the Internet service client is ready to send to the application server through the air interface when the information indicating that the Internet service optimization function needs to be started is received from the second service proxy function entity.

3. The method according to claim 1, further comprising:
forwarding, when monitoring that the sent message is a service message, the service message to the second service proxy function entity such that after the second service proxy function entity receives the service message, the second service proxy function entity forwards the service message to the application server, and receives a response message which is correspondingly returned by the application server after the application server receives the service message; and
receiving the response message sent by the second service proxy function entity and forwarding the response message to the Internet service client; or
forwarding, when monitoring that the sent message is a service message, the service message to the application server, receiving a response message which is returned by the application server after the application server receives the service message, and forwarding the response message to the Internet service client.

4. An Internet service control method, applied to a second service proxy function entity, comprising:
  proxying an Internet service client deployed in a terminal device to generate a heartbeat message or a polling message in response to sending information indicating that the Internet service optimization function needs to be started to a first service proxy function entity deployed in the terminal device, wherein the information indicating that the Internet service optimization function needs to be started indicates that a use rate of air interface resources is greater than a pre-defined threshold, wherein the air interface resources are associated with an area where the terminal device is currently located;
  proxying the Internet service client to send the generated heartbeat message or the polling message to an application server;
  monitoring, by the first service proxy function entity deployed in the terminal device, a type of a message which the Internet service client is ready to send to the application server through an air interface in response to receiving the information indicating that an Internet service optimization function needs to be started from the second service proxy function entity; and
  intercepting, when monitoring that the sent message is the heartbeat message or the polling message, the heartbeat message or the polling message,
  wherein the second service proxy function entity communicates with the application server through a second communication channel,
  wherein the second communication channel comprises no air interface channel, and
  wherein the application server is configured to process a service corresponding to the Internet service client.

5. The method according to claim 4, further comprising:
  receiving an area identifier sent by the first service proxy function entity of the area where the terminal device is currently located after monitoring that the Internet service client sends a login request message or successfully logs onto the application server;
  determining, according to the area identifier, whether the Internet service optimization function needs to be started in the area where the terminal device is currently located; and
  sending the information indicating that the Internet service optimization function needs to be started to the first service proxy function entity, and proxying the Internet service client deployed in the terminal device to generate the heartbeat message or the polling message when the Internet service optimization function needs to be started in the area where the terminal device is currently located.

6. The method according to claim 4, further comprising:
  receiving a service message sent by the application server to the Internet service client;
  determining whether an Internet Protocol (IP) channel between the application server and the Internet service client exists;
  forwarding the service message to the Internet service client through the existing IP channel when the IP channel between the application server and the Internet service client exists; and
  instructing, when the IP channel between the application server and the Internet service client does not exist, a short message service center to send, to the first service proxy function entity, a short message used to instruct an IP channel between the Internet service client and the application server to be established, and forwarding the service message to the Internet service client through the IP channel after the IP channel is established.

7. The method according to claim 5, further comprising:
  stop proxying the Internet service client to send the heartbeat message or the polling message to the application server after learning that the terminal device is disconnected from a network; and
  releasing corresponding resources.

8. A service proxy function entity, wherein the service proxy function entity is deployed in a terminal device, wherein an Internet service client is further deployed in the terminal device, and wherein the service proxy function entity comprises:
  a computer processor configured to:
    monitor a type of a message which the Internet service client is ready to send to an application server through an air interface in response to receiving indication information indicating that an Internet service optimization function needs to be started from a second service proxy function entity, wherein the information indicating that the Internet service optimization function needs to be started indicates that a use rate of air interface resources is greater than a pre-defined threshold, wherein the air interface resources are associated with an area where the terminal device is currently located; and
    intercept the heartbeat message or the polling message when monitoring that the sent message is a heartbeat message or a polling message,
  wherein the application server is configured to process a service corresponding to the Internet service client,
  wherein the application server further communicates with the second service proxy function entity through a second communication channel,
  wherein the second communication channel comprises no air interface channel, and
  wherein the second service proxy function entity proxies the Internet service client to send the heartbeat message or the polling message to the application server in response to sending the information indicating that the Internet service optimization function needs to be started to the terminal device.

9. The service proxy function entity according to claim 8, wherein the computer processor is further configured to:
  send, after it is monitored that the Internet service client sends a login request message or successfully logs onto the application server, an area identifier of the area where the terminal device is currently located to the second service proxy function entity such that the second service proxy function entity determines, according to the area identifier, whether the Internet service optimization function needs to be started in the area where the terminal device is currently located; and
  start, after receiving the indication information of starting the Internet service optimization function sent by the second service proxy function entity, the Internet service optimization function, and monitor the type of the message which the Internet service client is ready to send to the application server through the air interface.

10. The service proxy function entity according to claim 8, wherein the computer processor is configured to:
  forward, when the monitoring module monitors that the sent message is a service message, the service message to the second service proxy function entity such that after the second service proxy function entity receives the service message, the second service proxy function entity forwards the service message to the application server, and receives a response message which is correspondingly returned by the application server after the application server receives the service message; and receive the response message sent by the second service proxy function entity and forward the response message to the Internet service client; or forward, when the monitoring module monitors that the sent message is a service message, the service message to the application server, and receive a response message which is returned by the application server after the application server receives the service message, and forward the response message to the Internet service client.

11. A service proxy function entity, comprising:
a computer processor configured to:
proxy an Internet service client to generate a heartbeat message or a polling message in response to sending information indicating that an Internet service optimization function needs to be started to a first service proxy function entity deployed in a terminal device, wherein the information indicating that the Internet service optimization function needs to be started indicates that a use rate of air interface resources is greater than a pre-defined threshold, and wherein the air interface resources are associated with an area where the terminal device is currently located;
proxy the Internet service client to send the generated heartbeat message or the polling message to an application server,
wherein the first service proxy function entity deployed in a terminal device monitors a type of a message which the Internet service client is ready to send to the application server through an air interface in response to receiving information indicating that an Internet service optimization function needs to be started from the service proxy function entity, and intercepts the heartbeat message or the polling message when monitoring that the sent message is the heartbeat message or the polling message,
wherein the service proxy function entity communicates with the application server through the second communication channel,
wherein the second communication channel comprises no air interface channel, and
wherein the application server is configured to process a service corresponding to the Internet service client deployed in the terminal device.

12. The service proxy function entity according to claim 11, wherein the computer processor is further configured to:
receive, after it is monitored that the Internet service client sends a login request message or successfully logs onto the application server, an area identifier, sent by the first service proxy function entity, of the area where the terminal device is currently located;
determine, according to the area identifier, whether the Internet service optimization function needs to be started in the area where the terminal device is currently located; and
send the information indicating that the Internet service optimization function needs to be started to the first service proxy function entity when it is determined that the Internet service optimization function needs to be started in the area where the terminal device is currently located.

13. The service proxy function entity according to claim 11, wherein the processor is further configured to:
receive a service message sent by the application server to the Internet service client; and
determine whether an Internet Protocol (IP) channel between the application server and the Internet service client exists, forward the service message to the Internet service client through the existing IP channel when the IP channel between the application server and the Internet service client exists, and instruct a short message service center to send, to the first service proxy function entity, a short message used to instruct to establish an IP channel between the Internet service client and the application server when the IP channel between the application server and the Internet service client does not exist and forward the service message to the Internet service client through the IP channel after the IP channel is established.

14. An Internet service control, comprising:
a second service proxy function entity; and
a first service proxy function entity which is deployed in a terminal device,
wherein the second service proxy function entity communicates with an application server through a second communication channel,
wherein the second communication channel comprises no air interface channel,
wherein the application server is configured to process a service corresponding to an Internet service client deployed in the terminal device,
wherein the first service proxy function entity is configured to:
monitor a type of a message which the Internet service client is ready to send to the application server through an air interface in response to receiving information indicating that an Internet service optimization function needs to be started from the second service proxy function entity, wherein the information indicating that the Internet service optimization function needs to be started indicates that a use rate of air interface resources is greater than a pre-defined threshold and wherein the air interface resources are associated with an area where the terminal device currently located; and
intercept a heartbeat message or a polling message when monitoring that the sent message is the heartbeat message or the polling message, and
wherein the second service proxy function entity is configured to:
proxy the Internet service client to generate the heartbeat message or the polling message server in response to sending the information indicating that the Internet service optimization function needs to be started to the first service proxy function entity; and
proxy the Internet service client to send the generated heartbeat message or the polling message to the application server.

15. The Internet service control system according to claim 14, wherein the second service proxy function entity is deployed in an access network element or a gateway network element, or wherein the second service proxy function entity is connected to an access network element or a gateway network element.

* * * * *